(12) United States Patent
Sinha et al.

(10) Patent No.: US 9,712,604 B2
(45) Date of Patent: Jul. 18, 2017

(54) CUSTOMIZED CONFIGURATION OF CLOUD-BASED APPLICATIONS PRIOR TO DEPLOYMENT

(71) Applicant: VMware, Inc., Palo Alto, CA (US)

(72) Inventors: Rakesh Sinha, Sunnyvale, CA (US); Vishwas Nagaraja, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 337 days.

(21) Appl. No.: 14/292,296

(22) Filed: May 30, 2014

(65) Prior Publication Data
US 2015/0350101 A1 Dec. 3, 2015

(51) Int. Cl.
*G06F 15/173* (2006.01)
*H04L 29/08* (2006.01)
(Continued)

(52) U.S. Cl.
CPC ............ *H04L 67/10* (2013.01); *G06F 8/60* (2013.01); *G06F 9/00* (2013.01); *G06F 9/45533* (2013.01); *H04L 41/5041* (2013.01); *H04L 41/5096* (2013.01); *H04L 61/2015* (2013.01); *H04L 61/2038* (2013.01); *H04L 61/6022* (2013.01)

(58) Field of Classification Search
CPC ... G06F 8/00; G06F 9/00; G06F 9/455; H04L 41/5041; H04L 41/5096; H04L 67/10; H04L 61/2015; H04L 61/2038; H04L 61/6022
See application file for complete search history.

(56) References Cited

U.S. PATENT DOCUMENTS 4,975,836 A 12/1990 Hirosawa et al.
6,691,113 B1 2/2004 Harrison et al.
(Continued)

FOREIGN PATENT DOCUMENTS

EP 2383652 A1 11/2011
KR 2012-0013074 A 2/2012
(Continued)

OTHER PUBLICATIONS

International Search Report and Written Opinion PCT/2015/032924, Dated Dec. 31, 2015, Consists of 12 pages.
(Continued)

*Primary Examiner* — Jonathan Bui
(74) *Attorney, Agent, or Firm* — Patterson & Sheridan LLP

(57) ABSTRACT

A cloud computing environment consists of a cloud deployment platform with an application management server executing thereon, and a cloud management server configured to manage a plurality of virtual machines deployed in a cloud infrastructure. When a cloud-based application is deployed to the cloud infrastructure, a deployment plan for the cloud-based application is read, where the deployment plan comprises a first plurality of tasks to be executed in the cloud infrastructure. A determination is made that one or more custom tasks are required to be executed in the cloud infrastructure. After the determination, the one or more custom tasks are inserted into the first plurality of tasks to generate a second plurality of tasks. The second plurality of tasks is then transmitted to the cloud management server for execution in the cloud infrastructure.

19 Claims, 9 Drawing Sheets

(51) Int. Cl.
   *G06F 9/00*     (2006.01)
   *H04L 12/24*    (2006.01)
   *G06F 9/445*    (2006.01)
   *G06F 9/455*    (2006.01)
   *H04L 29/12*    (2006.01)

(56) References Cited

U.S. PATENT DOCUMENTS

| | | | |
|---|---|---|---|
| 7,068,680 | B1 | 6/2006 | Kaltenmark et al. |
| 7,549,149 | B2 | 6/2009 | Childress et al. |
| 8,171,470 | B2 | 5/2012 | Goldman et al. |
| 8,495,611 | B2 | 7/2013 | McCarthy et al. |
| 8,732,699 | B1 | 5/2014 | Hyser et al. |
| 8,782,744 | B1 | 7/2014 | Fuller et al. |
| 9,081,747 | B1* | 7/2015 | Tabieros ............... G06F 15/177 |
| 2002/0129242 | A1 | 9/2002 | Abbott |
| 2003/0163686 | A1 | 8/2003 | Ward et al. |
| 2006/0085785 | A1 | 4/2006 | Garrett |
| 2007/0168656 | A1 | 7/2007 | Paganetti et al. |
| 2008/0114984 | A1 | 5/2008 | Srinivasan et al. |
| 2008/0250407 | A1 | 10/2008 | Dadhia et al. |
| 2010/0049968 | A1 | 2/2010 | Dimitrakos et al. |
| 2010/0138823 | A1 | 6/2010 | Thornley |
| 2010/0205205 | A1 | 8/2010 | Hamel |
| 2011/0265164 | A1 | 10/2011 | Lucovsky et al. |
| 2011/0295987 | A1 | 12/2011 | Petushkov et al. |
| 2011/0296021 | A1 | 12/2011 | Dorai et al. |
| 2012/0054280 | A1 | 3/2012 | Shah |
| 2012/0054736 | A1 | 3/2012 | Arcese et al. |
| 2012/0170726 | A1 | 7/2012 | Schwartz |
| 2012/0179822 | A1 | 7/2012 | Grigsby et al. |
| 2012/0198438 | A1* | 8/2012 | Auer ..................... G06F 8/61 717/176 |
| 2012/0221726 | A1 | 8/2012 | Nguyen |
| 2012/0240112 | A1 | 9/2012 | Nishiguchi et al. |
| 2013/0103837 | A1 | 4/2013 | Krueger |
| 2013/0191528 | A1* | 7/2013 | Heninger ............... H04L 43/04 709/224 |
| 2013/0227091 | A1 | 8/2013 | Tompkins |
| 2013/0227560 | A1 | 8/2013 | McGrath et al. |
| 2013/0232463 | A1* | 9/2013 | Nagaraja ............... G06F 8/61 717/101 |
| 2013/0232480 | A1* | 9/2013 | Winterfeldt ........... G06F 8/60 717/177 |
| 2013/0232497 | A1 | 9/2013 | Jalagam et al. |
| 2013/0232498 | A1 | 9/2013 | Mangtani et al. |
| 2013/0263209 | A1 | 10/2013 | Panuganty |
| 2013/0268674 | A1 | 10/2013 | Bailey et al. |
| 2013/0297964 | A1 | 11/2013 | Hegdal et al. |
| 2014/0013315 | A1 | 1/2014 | Genevski et al. |
| 2014/0019538 | A1 | 1/2014 | Limpaecher et al. |
| 2014/0019621 | A1 | 1/2014 | Khan et al. |
| 2014/0033200 | A1 | 1/2014 | Tompkins |
| 2014/0082166 | A1 | 3/2014 | Robinson et al. |
| 2014/0101318 | A1 | 4/2014 | Ferris et al. |
| 2014/0201218 | A1 | 7/2014 | Catalano et al. |
| 2014/0201345 | A1 | 7/2014 | Abuelsaad et al. |
| 2014/0215049 | A1 | 7/2014 | Provaznik |
| 2014/0279201 | A1 | 9/2014 | Iyoob et al. |
| 2014/0280975 | A1* | 9/2014 | Mordani ............... H04L 41/5041 709/226 |
| 2014/0325068 | A1 | 10/2014 | Assuncao et al. |
| 2014/0365662 | A1 | 12/2014 | Dave et al. |
| 2015/0163288 | A1 | 6/2015 | Maes et al. |
| 2015/0347264 | A1* | 12/2015 | Mohammed ......... G06F 11/3006 714/45 |
| 2015/0350101 | A1* | 12/2015 | Sinha .................... H04L 67/10 709/226 |

FOREIGN PATENT DOCUMENTS

| | | |
|---|---|---|
| WO | 2013104217 A1 | 7/2013 |
| WO | 2013184134 A1 | 12/2013 |

OTHER PUBLICATIONS

Chieu, "Solution-based Deployment of Complex Application Services on a Cloud", Jul. 2010, pp. 282-287.
International Search Report and Written Opinion PCT/2015/033044, Dated Jul. 9, 2015, Consists of 9 pages.
International Search Report and Written Opinion PCT/2015/033394, Dated Jul. 21, 2015, Consists of 9 pages.
International Search Report and Written Opinion PCT/2015/032625, Dated Jul. 7, 2015, Consists of 9 pages.
U.S. Appl. No. 14/287,366, Final Office Action dated May 19, 2016.
U.S. Appl. No. 14/289,231, Final Office Action dated May 19, 2016.
U.S. Appl. No. 14/316,517, Office Action dated May 19, 2016.
U.S. Appl. No. 14/315,874, Final Office Action dated Jun. 17, 2016.
U.S. Appl. No. 14/316,507, Office Action dated Jun. 24, 2016.
U.S. Appl. No. 14/289,231, Office Action dated Dec. 1, 2016.
U.S. Appl. No. 14/316,517, Final Office Action dated Oct. 11, 2016.
U.S. Appl. No. 14/316,507, Office Action dated May 4, 2017.

* cited by examiner

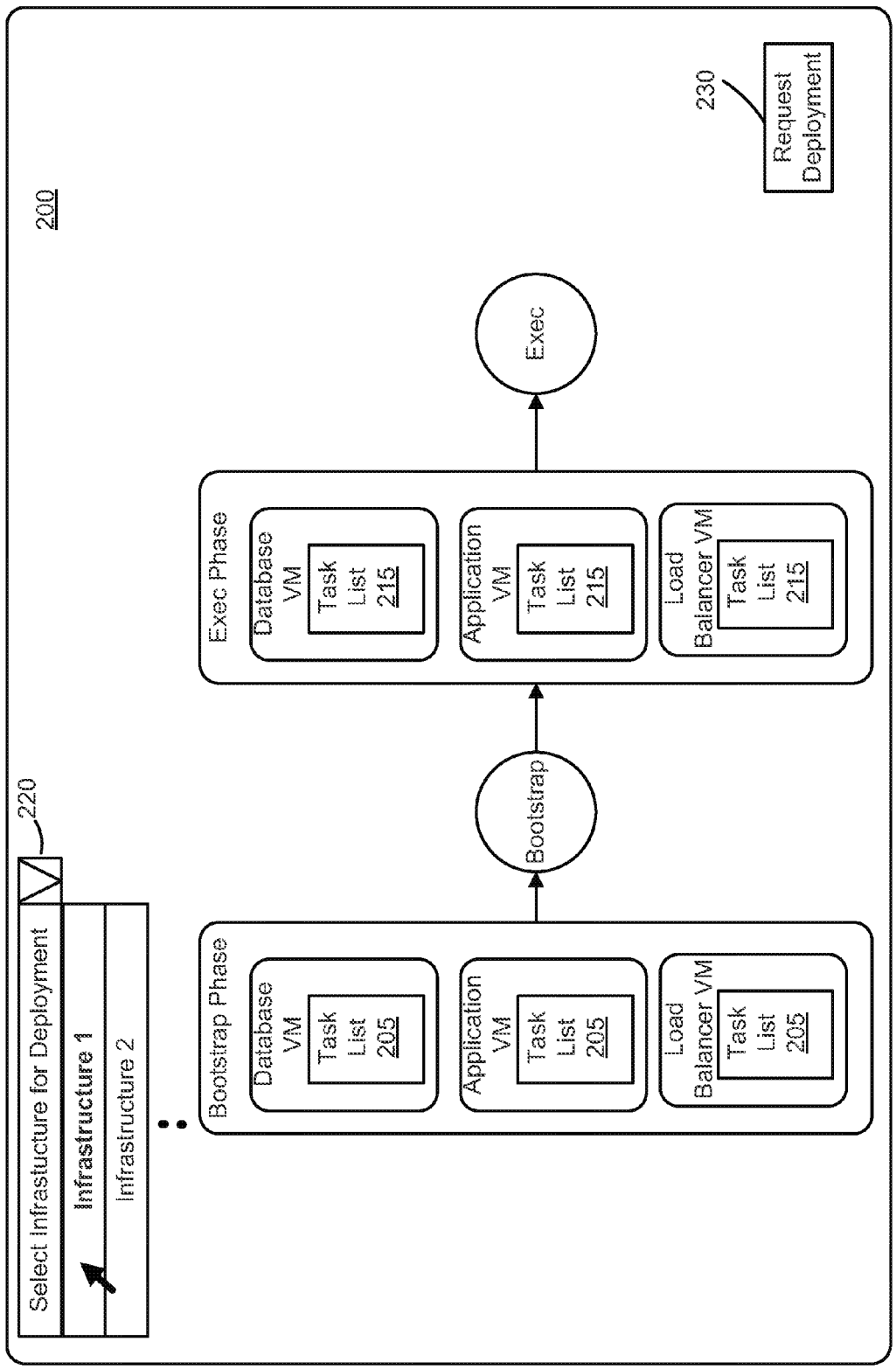

CUSTOMIZED CONFIGURATION OF CLOUD-BASED APPLICATIONS PRIOR TO DEPLOYMENT

CROSS-REFERENCE TO RELATED APPLICATIONS

This application is related to the following commonly assigned, co-pending applications: "Grouping Virtual Machines in a Cloud Application" (Ser. No. 14/287,366), which was filed on May 27, 2014, and "Tracking Application Deployment Errors Via Cloud Logs" (Ser. No. 14/289,231), which was filed on May 28, 2014, each of which is incorporated by reference herein in its entirety.

BACKGROUND

When deploying virtualized applications to one or more host computers in a cloud infrastructure, it is often required that certain customized configurations be performed, depending on the cloud provider of the infrastructure. Examples of different cloud providers include, but are not limited to, VMware vCloud® Automation Center, Amazon EC2®, and Microsoft® Azure. Since an infrastructure provider typically does not have knowledge of the actual applications deployed to it, it is usually left to an application designer to generate a deployment process that handles the required customized configuration. However, at the time an application is modeled, the designer does not possess complete knowledge of the target infrastructure. For instance, the deployment of certain network-based applications require internet protocol (IP) addresses of already-deployed server applications, or mount points for data storage devices on which infrastructure-specific configuration data may be stored. With a variety of different provider platforms, the problem of configuring and deploying applications for each platform has become a challenge for application designers.

A specific problem arises when IP addresses are allocated dynamically to virtual machines provisioned in a cloud infrastructure. Configuration of complex, multi-tiered applications often require IP addresses of provisioned virtual machines. For example, a load balancing application typically needs to connect to individual virtual machines deployed to a cloud at install/configuration time. Since the application designer does not know in advance what the IP addresses of the provisioned virtual machines are, just prior to application deployment, the IP addresses of the provisioned virtual machines need to be determined and the installation configuration data updated accordingly before installation of the load balancing application.

In addition, application deployment is currently performed using a simple queuing model. That is, deployment requests are often transmitted from a deployment platform to a cloud infrastructure without regard to whether certain previously transmitted tasks have completed. However, certain deployment tasks are dependent on the completion of previously transmitted tasks. In such cases, if task dependency is not enforced, then certain deployment tasks may be transmitted to a cloud infrastructure prematurely and, as a result, may fail. Therefore, a need has arisen to organize cloud application deployments in phases, where each phase consists of tasks that may be transmitted as a group, and where tasks in each phase may not begin until it is determined that all tasks of a preceding phase have completed executing.

SUMMARY

A method of deploying a cloud based application in a cloud computing environment, where the cloud computing environment includes a cloud deployment platform with an application management server executing thereon, and a cloud management server configured to manage a plurality of virtual machines deployed in a cloud infrastructure, is provided. The method includes the step of reading a deployment plan for the cloud based application, where the deployment plan comprises a first plurality of tasks to be executed in the cloud infrastructure. The method further includes the steps of determining that one or more custom tasks are required to be executed in the cloud infrastructure, inserting the one or more custom tasks into the first plurality of tasks to generate a second plurality of tasks, and transmitting the second plurality of tasks, in place of the first plurality of tasks, to the cloud management server for execution in the cloud infrastructure.

Further embodiments provide a non-transitory computer-readable medium that includes instructions that, when executed, enable a plurality of host computers to implement one or more aspects of the above method.

Further embodiments also provide a virtualized cloud-based computing system that is configured to implement one or more aspects of the above method.

BRIEF DESCRIPTION OF THE DRAWINGS

FIG. 2A is a block diagram that illustrates a user interface that displays deployment phases for deploying an application to a first target cloud infrastructure, according to embodiments.

DETAILED DESCRIPTION

Figure 1:
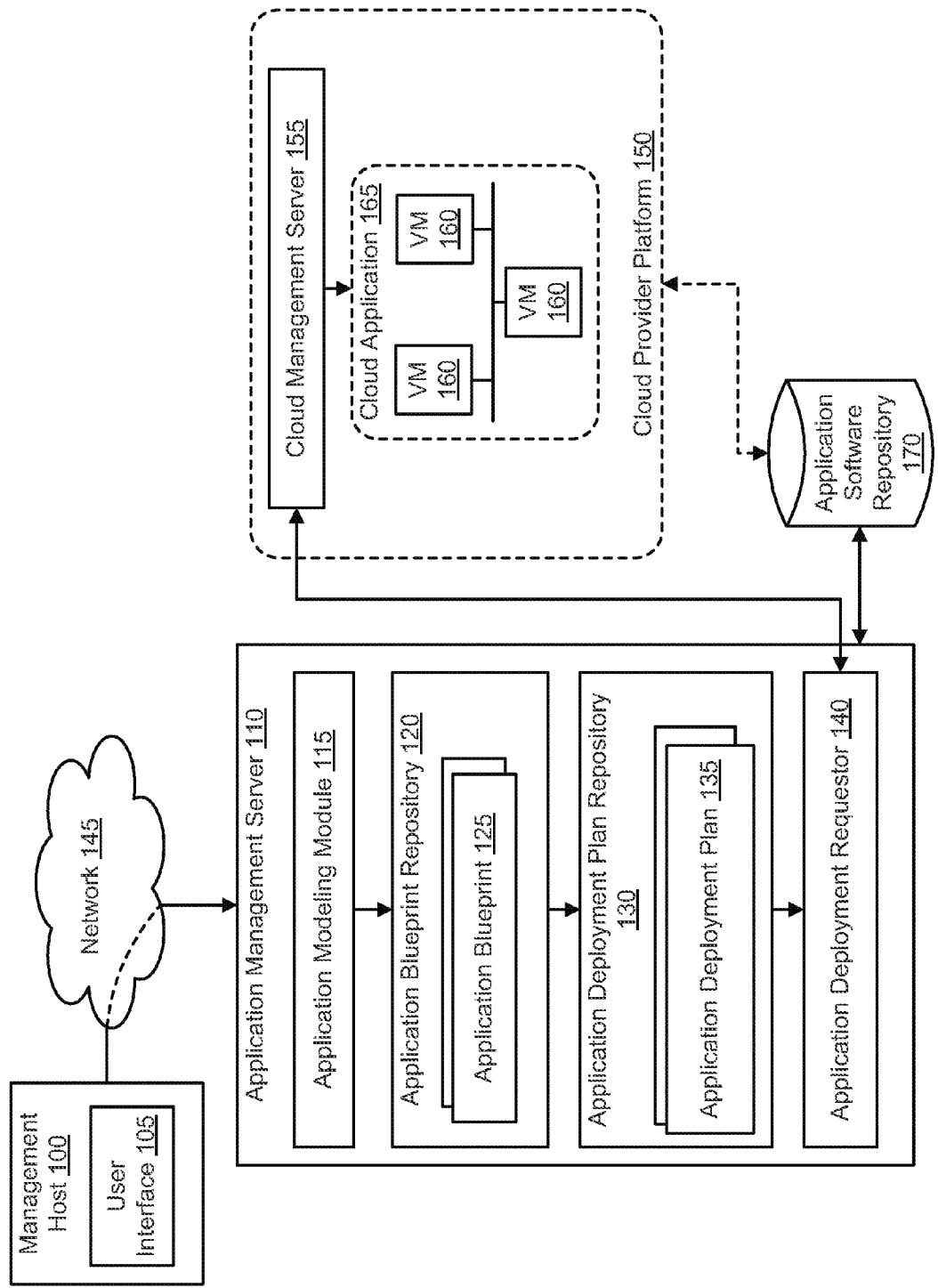
FIG. 1 is a block diagram that depicts a virtualized cloud-based computing environment in which one or more embodiments may be implemented.

FIG. 1 is a block diagram that depicts a virtualized cloud-based computing environment in which one or more embodiments may be implemented. The components of the depicted cloud-based computing environment include, but are not limited to, an application management server 110, a cloud provider platform 150, an application software repository 170, a computer network 145 and a management host 100.

Application management server 110 is an application provisioning platform that enables the creation of application configurations and topologies and provides for the deployment of applications to multiple cloud infrastructure platforms. In embodiments, an application designer accesses application management server 110 using a workstation in order to model a cloud-based application. In a virtualized environment, application modeling includes the selection of various application and system software modules, the selection of one or more virtual machines in which the software modules are to execute, and the selection of various virtual infrastructure devices (such as virtual network switches and virtual data storage devices) that the virtual machines access while executing. Examples of system software include guest operating systems of the virtual machines, web server software, as well as network device drivers and other low-level software that typically runs at the kernel level. Application software includes user-defined applications, pre-packaged vendor software, and database software. Application modeling also includes the creation of an application topology, which specifies how the various components of an application (i.e., the virtual machines and the software executing therein) are situated within the application in relation to each other, and how the components communicate with each other.

Further, once an application is modeled, an application designer typically creates a plan (often an automated, software-based plan) to deploy the various application components to a cloud-computing infrastructure. Once the application components are deployed, they execute in a holistic fashion as a unified cloud-based application. That is to say, the deployed components (e.g., virtual machines and the like) each execute software modules and communicate with one another in order to perform the various functions of the deployed application. One example of application management server 110 is vCloud® Application Director, which is commercially available from VMware, Inc. of Palo Alto, Calif.

Once an application designer completes modeling a desired application, the application model may be saved, in embodiments, as an application blueprint. An application blueprint may be thought of as defining the structure of a virtualized cloud-based application. Referring to the embodiment shown in FIG. 1, an application designer uses management host 100 in order to direct application management server 110 to generate application models. Management host 100 is, typically, a computer workstation or laptop computer with a keyboard, pointing device (e.g. mouse, trackball, or trackpad), and display. As shown in FIG. 1, management host 100 includes user interface 105. In embodiments, user interface 105 is a graphical user interface (GUI) that provides a graphical "canvas" that enables an application designer to model application topologies and generate application blueprints. In one or more embodiments, user interface 105 is configured with software that enables a designer to generate application blueprints by employing a drag-and-drop interaction. Using such an interaction, the designer may select application components (both software modules and virtualized hardware devices) from available "catalogs", and arrange the components in any number of ways to define the structure of the application.

As shown in the embodiment of FIG. 1, management host 100 accesses application management server 110 over network 145. Network 145 may be, in embodiments, a local area network, a campus area network, a metropolitan area network, or wide area network (such as the Internet). Management host 100 may also connect directly to application management server 110 over a serial or parallel port. Embodiments of management host 100 and application management server 110 communicate using any of a number of well-known data communication protocols, such as Ethernet and TCP/IP, as well as proprietary protocols.

Application management server 110 comprises a number of modules that enable the creation and deployment of virtualized cloud-based applications. In FIG. 1, application management server 110 includes application modeling module 115. Application modeling module 115 is accessed by an application designer using user interface 105 on management host 100. Under the direction of an application designer, application modeling module 115 selects the various software and virtual hardware components of an application from one or more catalogs (not shown), and arranges these components in a manner that defines the structure of an application. For example, an application designer may wish to define a "multi-tiered" virtualized cloud-based application. That is, the application comprises multiple software components that execute within multiple virtual machines.

As an example, an application designer may direct application modeling module 115 to model a cloud-based application comprising a database server, several application servers, and a load-balancing server. Each of the aforementioned servers may execute in a separate virtual machine. Each virtual machine communicates with the other virtual machines in order to execute the overall application. Thus, once such an application is deployed to a cloud infrastructure, an end user may access one application server (e.g., a user interface/security server) in order initiate an application request. The user interface/security server then, for example, accesses a "business logic" server in order to evaluate the request, which then accesses a database server to obtain data to satisfy the request, and so on. The load-balancing server evaluates the workloads of each of the virtual machines in which the application components execute and, when it finds a particular virtual machine to be overburdened, migrates an application component from the overburdened virtual machine to a virtual machine with spare processing capacity.

Once the application designer completes modeling a cloud-based application, the designer instructs application modeling module 115 to generate an application blueprint 125 based on the application just modeled. As mentioned above, the application blueprint 125 specifies the structure of a cloud-based application (e.g., the software and virtual hardware components, and the interrelationships of these components). In embodiments, application blueprint 125 comprises one or more files or data structures that fully describe the structure of a virtualized cloud-based application. When application modeling module 115 generates application blueprints 125, the blueprints are stored in application blueprint repository 120. In embodiments, application blueprint repository is a relational or hierarchical database within application management server 110, in other embodiments, application blueprint repository 120 is stored on a data storage device external to, but accessible by, application management server 110.

Once application blueprints are generated, there remains the task of deploying the application represented by the application blueprints to one or more cloud infrastructures. In order to deploy a virtualized cloud-based application, embodiments of application management server 110 include a module to generate an application deployment plan 135 for the application. Application management server 110 generates application deployment plans at the request of an application designer using management host 100. Management host 100 communicates with application modeling module 115 in order to generate deployment plans. In other embodiments, management host 100 directs other components of application management server 110 (not shown), which are dedicated to the task of generating application deployment plans.

Referring to FIG. 1, application deployment plans 135 are each generated based on a corresponding application blueprint 125. Each application deployment plan 135 specifies the various tasks that must be performed in order to carry out the deployment of the application described by the corresponding application blueprint 135. As shown in the figure, application deployment plan 135 is stored in application deployment plan repository. Application deployment plan repository 130, as was the case for application blueprint repository 120, may be a relational or hierarchical database (or any internal data structure) within application management server 110. Alternatively, application deployment plan repository 130 may comprise one or more files, or a database, stored in a data storage device that is external to, but accessible by, application management server 110.

In typical embodiments, application deployment plans 135 comprise groupings of deployment tasks that are referred to as deployment "phases." Deployment phases usually comprise tasks that are grouped together that can usually be performed in parallel. In one or more embodiments, a first phase of a deployment is referred to as a "bootstrap" phase. In a bootstrap phase, virtual machines that comprise the virtualized cloud-based application are provisioned (i.e., instantiated) in the cloud infrastructure. The virtual machines that are instantiated during the bootstrap phase can often be instantiated in parallel with each other, provided that the cloud-based software (described below) that instantiates the virtual machines is capable of multi-threaded execution.

Aside from logically grouping potentially parallel deployment tasks together, deployment phases may also be used to define logical stopping points of a deployment. That is, there are certain tasks in a deployment that may only be performed once all tasks in a prior phase have completed. As a simple example, a single virtual machine application is to be deployed to a cloud infrastructure. The designer of the application directs application management server 110 to generate an application deployment plan 135 for the application, where the deployment plan consists of two phases: a bootstrap phase and a user application phase (referred to herein as an "exec" phase). The virtual machine is provisioned during the bootstrap phase. That is, the necessary tasks in order to instantiate a virtual machine in the cloud infrastructure are performed during the bootstrap phase. On the other hand, during the user application phase, application and system software is installed on the virtual machine provisioned in the bootstrap phase. In some embodiments, all bootstrap phase tasks must complete prior to commencing any tasks in the user application phase.

Further, application deployment plans 135 provide for the specification of task dependencies. That is, an application designer may specify that certain deployment tasks may only be executed after certain other deployment tasks have completed. For example, a designer may wish to deploy two application servers and a load-balancing server. It is often the case that load-balancing servers, at install time, need to find and "register" the identities and addresses of other servers that are to be load-balanced. Hence, it makes little sense to deploy the load-balancing server before the application servers are deployed. Using application management server 110, application designers may build task dependencies into an application deployment plan in order to ensure that certain virtual machines are deployed prior to other virtual machines, or that certain software packages are installed before other software packages.

Referring back to FIG. 1, application management server 110 also includes application deployment requestor 140. In one or more embodiments, application deployment requestor 140 is a software module that communicates with a variety of target cloud infrastructures in order to conduct the deployment of a virtualized cloud-based application. Application deployment requestor 140 accesses application deployment plans 135, and transmits deployment requests to a cloud infrastructure according to the deployment plan. For example, in the simple example outlined above, a sample application deployment plan specifies that, in a first phase, a virtual machine is to be provisioned in a cloud infrastructure. Further, in a second phase, application and system software is installed on the virtual machine. Thus, according to embodiments, application deployment requestor receives a request from a designer to deploy the application corresponding to the aforementioned plan. Application deployment requestor 140 then initiates a first deployment phase by transmitting a first request to provision the virtual machine in the cloud infrastructure. This request is transmitted to a server process that runs in the cloud, which is configured to, among other things, instantiate virtual machines in the cloud. Application deployment requestor 140 monitors the instantiation process and, once the virtual machine is instantiated, application deployment requestor 140 initiates the next phase, namely, the installation of software on the deployed virtual machine. In order to facilitate the installation of software on the virtual machine, embodiments of application deployment requestor 140 are configured to transmit location information to the virtual machine so that an agent running therein (described below) can access and download required software packages. Application deployment requestor 140 is also configured to initiate and monitor the completion of deployment phases. As mentioned earlier, a deployment phase is a set of deployment tasks that are grouped together, each of which must complete before a subsequent deployment phase may be started.

As shown in FIG. 1, application management server (via application deployment requestor 140) communicates with a cloud infrastructure. The cloud infrastructure of FIG. 1 is referred to as cloud provider platform 150. Examples of cloud provider platform 150 include, but are not limited to, Microsoft Azure, Amazon Elastic Compute Cloud (EC2), and VMware's vCloud® Automation Center™. Typically, cloud provider platform 150 includes a server module, referred to herein as cloud management server 155. Cloud management server 155 is generally configured to manage cloud computing resources. For example, cloud computing infrastructures typically include scores of host computers (usually server-class computers), and several storage area networks with pluralities of storage devices connected thereto. Further, cloud computing infrastructures include computer networking hardware to enable data communication among the various hosts, storage units, and other components that make up the cloud infrastructure. Embodiments of cloud management server 155 are configured to monitor and manage these resources. Further, cloud management server 155 is typically accessed by a cloud administrator (i.e., a system administrator) from a system console device (not shown).

Among the tasks that cloud management server 155 performs is the instantiation of virtual machines in the cloud infrastructure. That is, cloud management server 155 is configured to receive requests from external sources and, in response to the requests, provision one or more virtual machines on one or more computer hosts in the cloud. Virtual machines that are instantiated by cloud management server 155 are software emulations of physical computing devices. When embodiments of cloud management server 155 instantiate a virtual machine, the virtual machine is provisioned with "bootstrap agent" software. Bootstrap agent software enables the virtual machine to be started (i.e., "booted up"), and then to access and install additional software modules (e.g., guest operating system software). Once the bootstrap agent software downloads and installs a guest operating system (and performs basic configuration tasks), the virtual machine is said to be provisioned (or instantiated) in the cloud. Among the configuration that is often required for a virtual machine is the assignment of a network address to a virtual network adapter or network interface card (i.e., a "NIC") configured therein. The addresses that a virtual network adapter is assigned include a media access control (MAC) address and an IP address. Once MAC and IP addresses are assigned to the NIC (or NICs) of a virtual machine, then those NICs may be addressed by devices external to the virtual machine.

As shown in FIG. 1, cloud management server 155 receives requests from application deployment module 140. In the embodiment shown, application deployment requestor 140 communicates directly with cloud management server 155, although such communication may occur over a local area network, wide area network, wireless network, and the like. The requests that application deployment requestor 140 transmits to cloud management server 155 correspond to deployment tasks in application deployment plan 135. The requests include requests to instantiate one or more virtual machines in the cloud infrastructure and to install software on the instantiated virtual machines. In the embodiment of FIG. 1, cloud management server 155 has instantiated three virtual machines (VMs 160) in response to one or more requests from application deployment requestor 140.

In embodiments, once virtual machines are instantiated in the cloud infrastructure, application deployment requestor 140 transmits to each instantiated virtual machine a deployment agent (not shown). Deployment agents are programs that are callable by cloud management server 155, and which the virtual machines execute in order to download software packages after the virtual machines are instantiated.

In order to install computer software on the virtual machines, cloud management server 155 invokes the deployment agents installed within VMs 160, at the request of application deployment requestor 140. In some embodiments, the deployment agents of VMs 160 communicate back through cloud management server 155 to application deployment requestor 140 to request transmission of computer software packages that are to be installed on VMs 160. In such embodiments, application management server 110 accesses a repository of computer software (such as application software repository 170), reads the requested software packages (e.g., JAR files, WAR files, DMG files, or EXE installation packages), and transmits these to cloud management server 155 for deployment to and execution on VMs 160. Alternatively, in other embodiments, another process running on cloud provider platform 150 (or the VMs 160 themselves) directly access application software repository 170 in order to obtain the required software packages.

It should be noted that throughout the process of virtual machine instantiation and software installation, application management server (through application deployment requestor 140) monitors progress of the overall application deployment.

When a virtualized cloud-based application is deployed to a cloud infrastructure, it is frequently the case that certain application components require the availability of certain system-oriented data before they can be properly configured. For example, an application that accesses a database at runtime may be installed by an installation script, where the installation script goes out and accesses the database during installation in order to ensure that the database is available and that the application has access to the database. Another example is the case of a load-balancing server. As mentioned earlier, at the time of their installation, load balancing servers typically find and register virtual machines that are to be load-balanced. Thus, the installation script of the load balancing server typically needs to know the addresses of other virtual machines in order to register those virtual machines. In still another example, an application may require that a specific network drive be mounted during installation.

Further, whether or not certain system-oriented data that is required by the application component is available is often dependent upon the target cloud infrastructure in which the application is to be deployed. For example, it may be the case that certain cloud infrastructure platforms provide IP addresses for all virtual machines deployed therein at the time the virtual machines are instantiated. However, other cloud infrastructure platforms do not provide these IP addresses. This is especially true in cloud-based computing environment that implement a Dynamic Host Control Program protocol scheme, which provides for dynamic allocation and assignment of IP addresses to virtual and physical devices configured therein. Because installation of some application (e.g., load balancers) requires the IP addresses of virtual machines deployed to the cloud, there is a need to provide those addresses to the installation process before starting the installation.

Thus, for those cloud infrastructure platforms that do not readily make available dynamically assigned IP addresses at instantiation time, it is advantageous to execute tasks to discover and provide dynamically assigned IP addresses to installation processes that require them. These tasks are executed after the so-called "bootstrap" phase (i.e., the deployment phase during which virtual machines are instantiated in the cloud) and before the so-called "exec" phase (i.e., a deployment phase during which system and application software is installed on the virtual machines according to an application deployment plan). Such tasks are referred to herein as being part of a "pre-exec" deployment phase. However, it should also be noted that executing the aforementioned tasks of the pre-exec deployment phase is not required for deployment on all cloud infrastructure platforms. For example, as previously mentioned, some cloud infrastructure platforms provide IP addresses for all virtual machines at the time of instantiation of the virtual machines. Thus, for those platforms, it is unnecessary to execute tasks to discover already known IP addresses. What is needed is a mechanism to dynamically inject the pre-exec deployment phase tasks into a deployment plan based on the type of target cloud infrastructure.

Figure 2B:
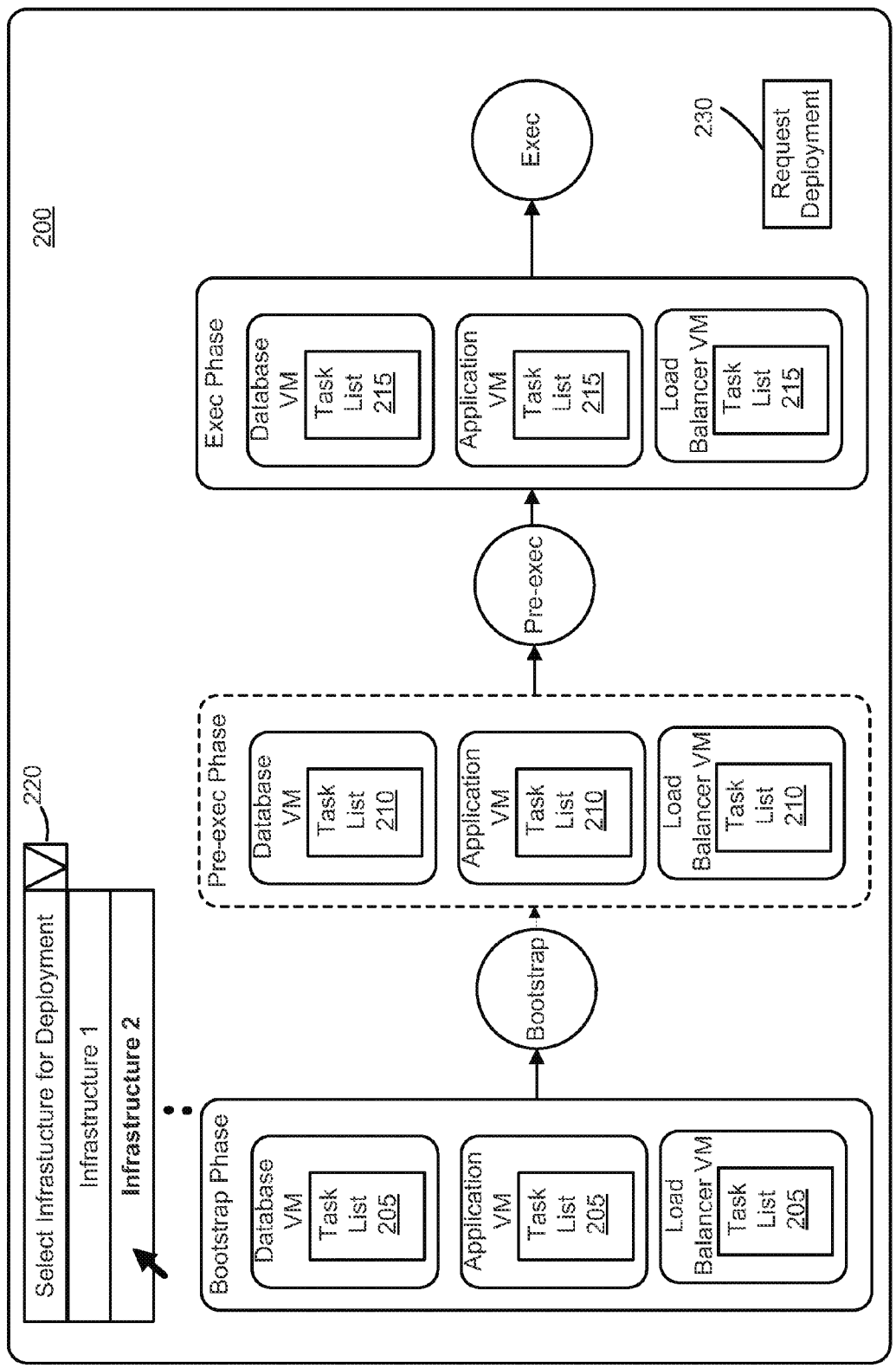
FIG. 2B is a block diagram that illustrates a user interface that displays deployment phases for deploying an application to a second target cloud infrastructure, according to embodiments.

FIGS. 2A and 2B depict a sample user interface 200 that interacts with application management server 110 in order to generate an application deployment plan and to request deployment of the corresponding application, where a new "pre-exec" phase is injected into the deployment plan based on a selection of a target cloud infrastructure for deployment.

FIG. 2A depicts deployment phases in user interface 200, where the target cloud infrastructure does not require the execution thereon of any "pre-exec" phase tasks. FIG. 2A illustrates bootstrap and exec deployment phases for the deployment of a multi-tiered virtualized cloud-based application. The application is comprised of three virtual machines: a database virtual machine, an application virtual, and a load balancer virtual machine. All three virtual machines, after being deployment in a cloud infrastructure, are configured to execute in a coordinated fashion a cloud-based application.

As shown in FIG. 2A, the first deployment phase is a bootstrap phase. As previously mentioned, virtual machines are provisioned and instantiated in the cloud during the bootstrap phase. As shown in FIG. 2A, the provisioning of each virtual machine comprises the execution of tasks from task list 205. Task list 205 includes, for example, a task for instructing a cloud management server (such as cloud management server 155 in FIG. 1) to instantiate the software structures in the cloud infrastructure for the corresponding virtual machine. A second task included in task list 205 transmits and installs a deployment agent software module on each of the virtual machines. As mentioned above, in embodiments, the deployment agent issues requests for software packages, receives the software packages, and invokes the installation program (or script) of each package, which results in the installation of the required software on the virtual machine. It should be noted that the tasks in task list 205 need not be identical for each virtual machine. That is, certain virtual machines may require the execution of certain tasks that are not required by other virtual machines. However, what all tasks in the task lists 205 share in common is that all such tasks are transmitted and executed in the same deployment phase (i.e., the bootstrap phase). Once all tasks in task list 205 complete for each virtual machine during the bootstrap phase, then the bootstrap phase is complete.

FIG. 2A also depicts a "join point" after the bootstrap phase, which is labeled "bootstrap" in FIG. 2A. Join points represent discrete points in time for a particular application deployment and appear, specifically, between phases of the deployment. For example, join point "bootstrap" immediately follows the bootstrap phase and also immediately precedes the subsequent "exec" phase. Each join point represents a point in time that application management server (in executing the deployment process) stops and assesses whether all tasks of an immediately preceding phase have completed. Thus, join point "bootstrap" is a point in time of the deployment of the multi-tiered application comprising database, application, and load balancing virtual machines where application management server 110 determines whether all tasks in the immediately preceding deployment phase (i.e. the bootstrap phase) have completed.

For example, assuming that each of tasks lists 205 comprise tasks for provisioning the corresponding virtual machine to a cloud infrastructure and for distributing a deployment agent to the virtual machine, application management server 110 determines, at the bootstrap join point, that the bootstrap phase is complete once both of the aforementioned tasks have completed on each of the virtual machines being deployed. At that point, application management server 110 determines that the deployment of the multi-tiered application may proceed to the next phase (i.e., the "exec" phase). If, however, application management server 110 determines, at the bootstrap join point, that any of the tasks in the bootstrap phase have not completed (or have failed) then the deployment of the multi-tiered application is halted until the tasks complete, or until a system administrator takes corrective action.

FIG. 2A also depicts a representation in user interface 200 of the exec deployment phase. In one or more embodiments, the exec deployment phase comprises tasks that install, configure, and start applications in each of the target virtual machines deployed in the prior bootstrap phase. For example, as shown in FIG. 2A, during the exec phase, a database application is installed, configured, and started on the database virtual machine, via install, config, and start tasks in task list 215. Further, the application virtual machine has installed therein a user-defined application through the execution of corresponding tasks in task list 215 for the application virtual machine. Finally, the load balancer virtual machine has load balancing server software installed therein by the execution of corresponding tasks in task list 215 for the load balancer virtual machine. It should be noted that, in embodiments, the execution of the tasks in task lists 215 for each of the virtual machines depicted in the exec phase of FIG. 2A includes: (1) application deployment requestor 140 transmitting a request to cloud management server 155; (2) cloud management server 155 invoking a deployment agent on a corresponding VM 160; (3) the deployment agent requesting required software from application management server 110; (4) the deployment agent receiving the required software installation package from application management server 110. It should be noted that the aforementioned process is only one example, and that other combinations of steps that, when carried out, achieve the installation of software within the virtual machines are contemplated and are within the scope of the present invention.

In addition, FIG. 2A includes a second join point, which is labeled "exec" in the figure, and which depicts a second stopping point in the deployment of the multi-tiered application. As was the case for the bootstrap join point, application management server 110 determines, at the exec join point, whether all tasks in all task lists 215 in the exec phase have completed for all virtual machines being deployed. If application management server 110 determines that all tasks have not completed, then the deployment of the multi-tiered application is halted until such time that all tasks in the task lists 215 have completed, or until a system administrator takes corrective action. On the other hand, if application management server 110 determines, at the exec join point, that all tasks in task lists 215 have completed, then the deployment of the multi-tiered application finishes, or, alternatively, may proceed to a next phase (not shown).

In addition, the embodiment of user interface 200 depicted in FIG. 2A shows pulldown menu 220. Pulldown menu 220 is a GUI element that, when expanded, displays a list of target infrastructure environments for deployment of the multi-tiered application. For example, in an embodiment, pulldown menu 220 includes list entries for vCloud Automation Center, Amazon EC2, and Microsoft Azure. As previously mentioned, depending upon a target cloud infrastructure, one or more tasks may need to be executed in a "pre-exec" phase that is situated in the deployment between the bootstrap and exec phases. Embodiments of user interface 200 are configured to detect a selection of a target cloud infrastructure for deployment and, depending on the selected target cloud infrastructure, inject into the deployment one or more tasks in a pre-exec phase.

In the embodiment depicted in FIG. 2A, an end user selects "Infrastructure 1" from pulldown menu 220. According to the depicted embodiment, Infrastructure 1 is determined as not requiring the execution of any pre-exec phase tasks. Therefore, when Infrastructure 1 is selected from pulldown menu 220, no additional pre-exec phase tasks are included in the deployment shown.

Finally, in the embodiment depicted in FIG. 2A, user interface 200 includes a button 230 for requesting the deployment of the displayed deployment plan. That is, when button 230 is selected by an end user, application management server 110 generates and transmits deployment requests to cloud management server 155.

FIG. 2B depicts user interface 200 from FIG. 2A following the selection of a different target cloud infrastructure (Infrastructure 2) from pulldown menu 220, where Infrastructure 2 is determined (by application management server 110) to require the execution (in the cloud infrastructure) of pre-exec phase tasks after the bootstrap phase and before the exec phase.

In the embodiment of FIG. 2B, once Infrastructure 2 is selected from pulldown menu 220, user interface 200 depicts the injection (by application management server 110) of a new pre-exec phase into the overall deployment. As shown, the pre-exec phase is inserted into the deployment after the bootstrap join point and before the exec phase. Further, a new pre-exec join point is inserted after the pre-exec phase. It should be noted that the selection of Infrastructure 2 from pulldown menu 220 triggers, in embodiments, the display of a potential change to the application deployment plan. That is, any change to the actual corresponding application deployment plan 135 in application deployment plan repository 130 is made by application management server 110. In some embodiments, user interface 200 includes a Save button to request that application management server 110 replace the stored application deployment plan with the displayed application deployment plan.

The pre-exec deployment phase depicts, for each virtual machine in the multi-tiered application, a new task list 210. In embodiments, task lists 210 include infrastructure-specific network setup tasks. Such network setup tasks may implement a process whereby each virtual machine executes a program to determine its own (or any other) dynamically assigned IP address. However, such a network setup task is only one example of tasks that may execute in the pre-exec phase. The pre-exec phase may comprise any task executable by any combination of the deployed virtual machines.

In addition, the pre-exec join point is shown immediately following the newly added pre-exec phase. The pre-exec join point represents another stopping point in the application deployment process, where application management server 110 determines whether all tasks in task lists 210 in the pre-exec phase (e.g., the network setup tasks for each of the virtual machines being deployed) have completed. As is the case with the join points previously described, if application management server 110 determines, at the pre-exec join point that at least one of the tasks in task lists 210 in the pre-exec phase has not completed, then the deployment of the multi-tiered application is halted. If, however, application management server 110 determines, at the pre-exec join point that all tasks 210 in the pre-exec phase have completed, then the deployment of the multi-tiered application proceeds to the subsequent phase (i.e., the exec phase, as shown in FIG. 2B).

Figure 3A:
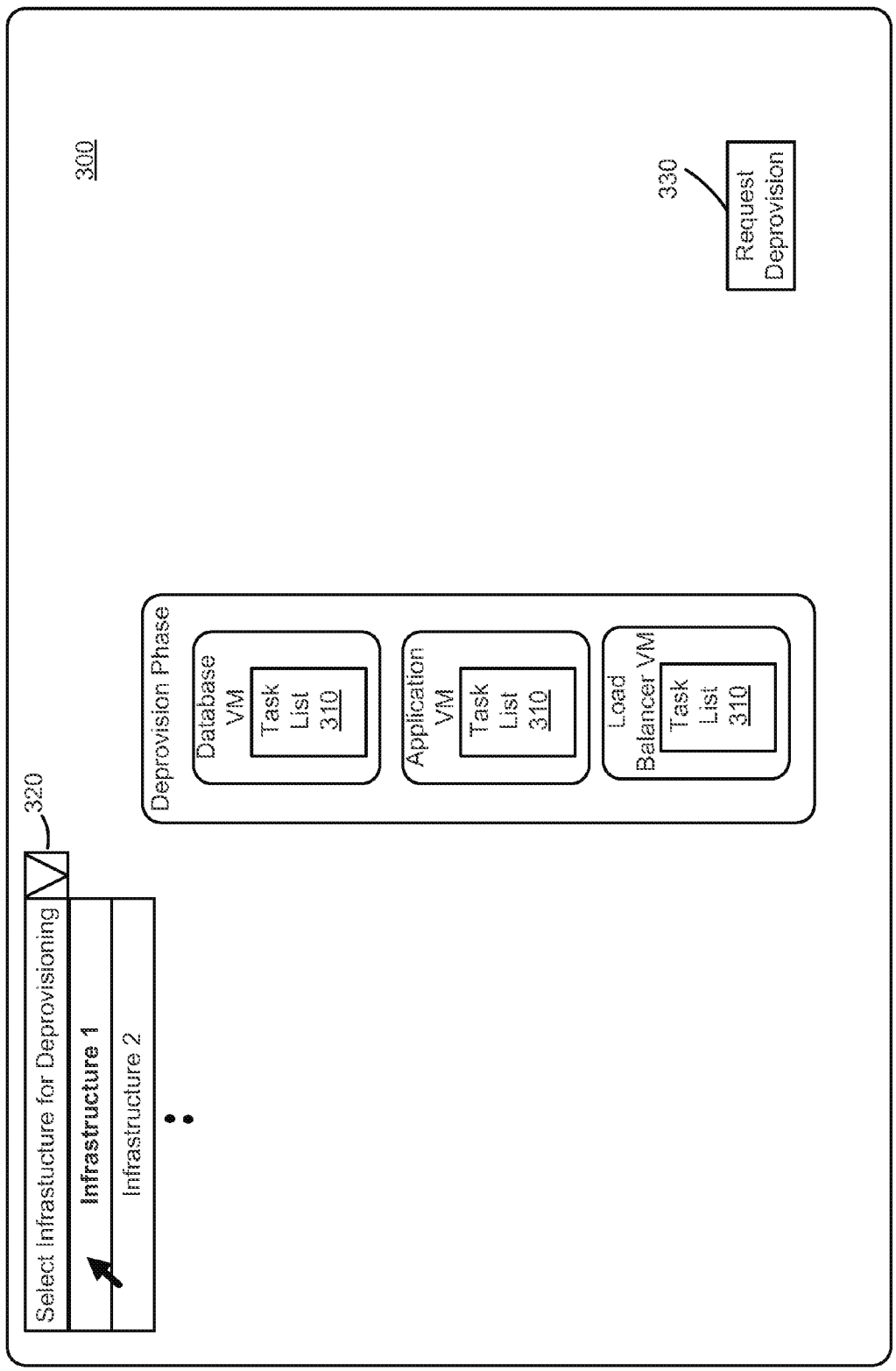
FIG. 3A is a block diagram that depicts a user interface that displays a deprovisioning phase for deprovisioning a cloud-based application from a first target infrastructure, according to embodiments.

The insertion of additional infrastructure-dependent tasks is not limited to the deployment of virtualized cloud-based applications. Embodiments of application management server 110 are also configured to deprovision and deallocate deployed cloud-based applications. Deprovisioning an application typically involves completing any application requests currently in execution, quiescing any running application tasks, and then deallocating cloud resources from the quiesced application. User interface 300 in FIG. 3A depicts a sample user interface that displays an application deprovisioning plan. As shown, user interface 300 includes a representation of a deprovision phase. The deprovision phase comprises task lists 310 that are executed for each virtual machine in order to deallocate cloud-based applications from a selected cloud infrastructure. For example, in the embodiment of FIG. 3A, each of the virtual machines (database, application, and load balancer) executes two tasks: a first task to quiesce the application executing therein, and a second task to uninstall the virtual machine. In typical embodiments, a quiesce task is a custom task for each application component, which cleanly halts the operation of that component. For example, with respect to the database application executing in the database virtual machine, a quiesce task would ensure that any updates made to an external persistent storage device are completed in order to preserve data integrity.

An uninstall task is usually performed by cloud management server 155 for each virtual machine to be deallocated from the cloud infrastructure. An uninstall task frees up system memory and other cloud resources that are typically found in any cloud infrastructure platform. However, there are instances where certain cloud infrastructure platforms might require certain infrastructure-specific tasks to be executed once an application has been deprovisioned. For example, certain cloud infrastructure platforms have specialized components, such as data structures that store statistical or performance data that is to be found on only that particular platform. Thus, in order to "cleanse" a particular infrastructure platform after deprovisioning, it is often necessary to execute one or more infrastructure-specific tasks.

In addition, the embodiment of user interface 300 depicted in FIG. 3A shows pulldown menu 320. As was described with respect to pulldown menu 220 of FIGS. 2A and 2B, pulldown menu 320 is a GUI element that, when expanded, displays a list of target infrastructure environments. With respect to FIG. 3A, these target environments specify cloud infrastructure platforms from which a cloud-based application is to be deprovisioned. Embodiments of user interface 300 are configured to detect a selection of a target cloud infrastructure for deprovisioning and, depending on the selected target cloud infrastructure, inject into the deprovisioning operation one or more tasks in a "cleanup" phase.

As shown in FIG. 3A, an end user selects "Infrastructure 1" from pulldown menu 220. According to the depicted embodiment, Infrastructure 1 is determined as not requiring the execution of any tasks in a cleanup phase. Therefore, when Infrastructure 1 is selected from pulldown menu 220, no additional cleanup phase is included in the deployment shown.

Figure 3B:
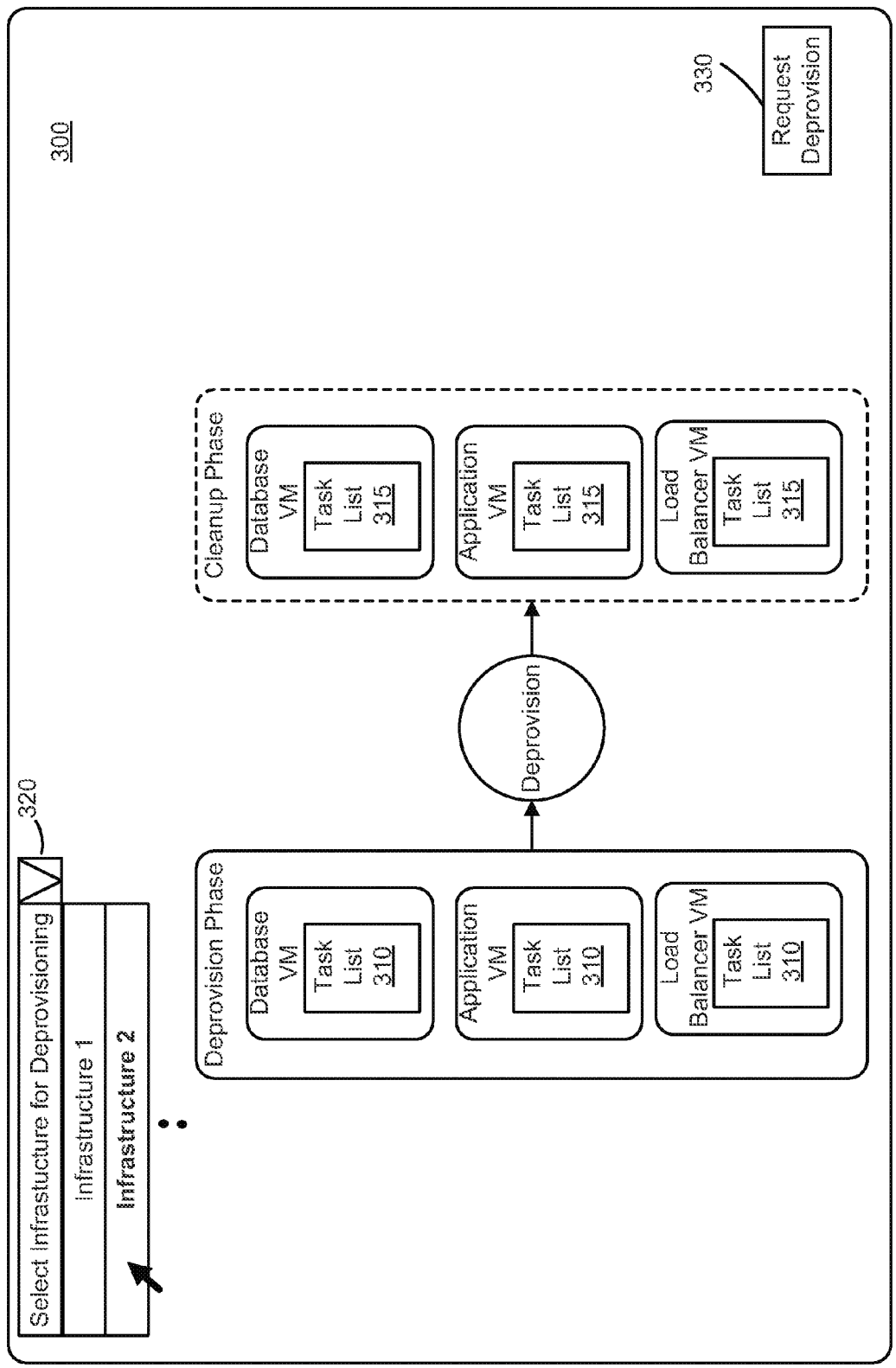
FIG. 3B is a block diagram that depicts a user interface that displays deprovisioning and cleanup phases for deprovisioning a cloud-based application from a second target infrastructure, according to embodiments.

FIG. 3B depicts user interface 300 following the selection from pulldown menu 320 of a different target infrastructure (Infrastructure 2) from which a multi-tiered cloud-based application is to be deprovisioned. As was described with respect to FIG. 2B, in one or more embodiments, the selection of a specific target infrastructure triggers the generation and insertion of a new phase. In the embodiment of FIG. 3B, Infrastructure 2 is determined as requiring the execution of tasks in a cleanup phase. Hence, user interface 300 displays a representation of a cleanup phase. The depicted cleanup phase includes cleanup tasks in task lists 315 that are to be executed on behalf of each deprovisioned virtual machine. Note that these tasks are typically performed by cloud management server 155 upon receiving a request by application management server 110.

Further, in the embodiment depicted in FIG. 3B, user interface 300 includes a button 330 for requesting deprovisioning of the application according to the displayed deprovision plan. That is, when button 330 is selected by an end user, application management server 110 generates and transmits deprovisioning requests to cloud management server 155.

In addition, FIG. 3B depicts a deprovision join point. The deprovision join point represents a stopping point in the deprovisioning process. That is, at the deprovision join point, application management server 110 determines whether all tasks in the previous phase have completed. Thus, in FIG. 3B, assuming the illustrated deprovisioning plan is put into execution via selection of button 320, application management server 110 determines whether quiesce and uninstall tasks in task lists 310 for each of the virtual machines have completed. If each of these tasks has completed, then the deprovisioning process proceeds to the next phase, namely, the cleanup phase shown in FIG. 3B. However, if application management server 110 determines that one or more tasks in task lists 310 of the deprovision phase has not completed, then the deprovisioning process halts.

Figure 4:
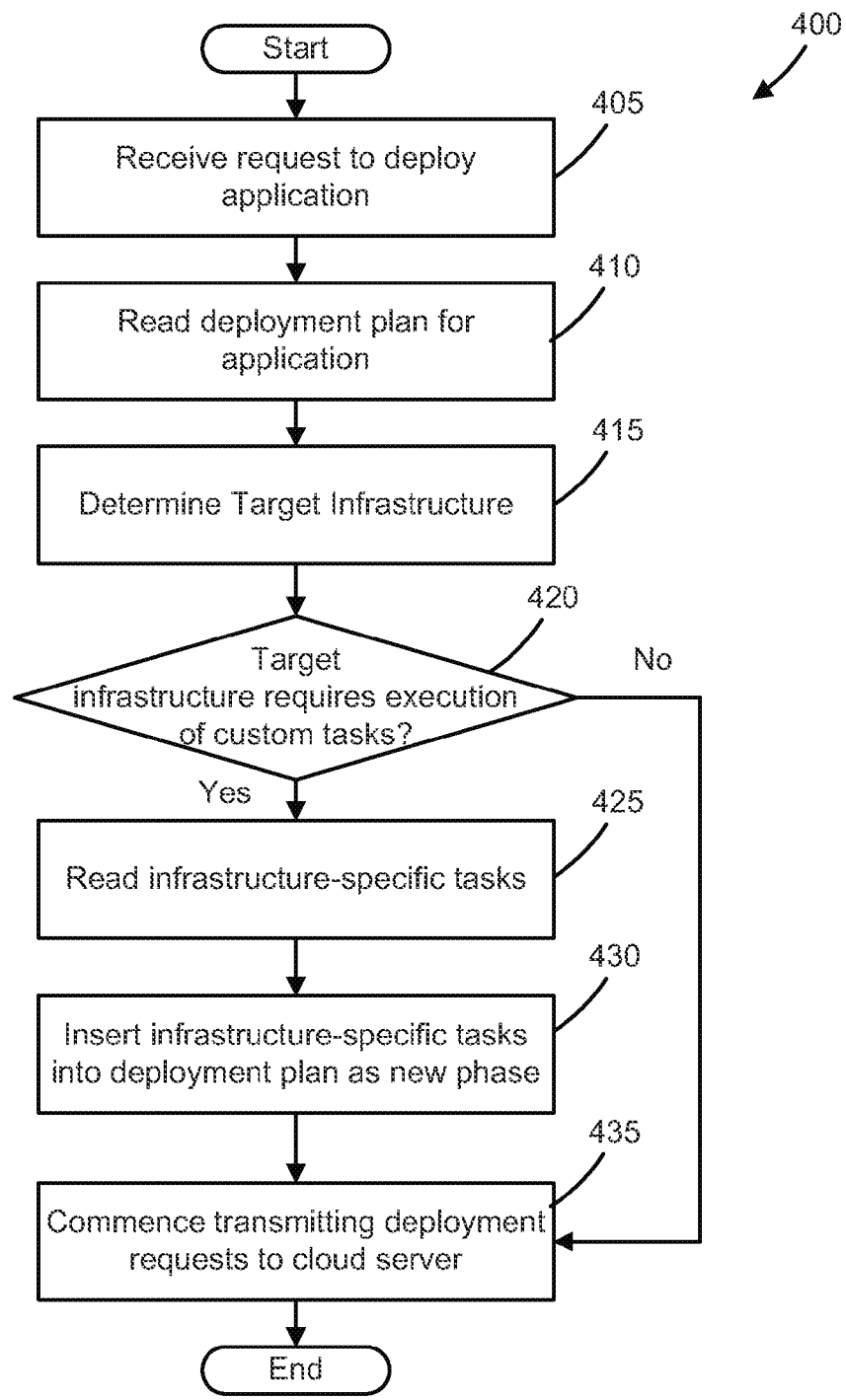
FIG. 4 is a flow diagram that depicts a method for determining and transmitting deployment tasks to deploy a cloud-based application, according to one or more embodiments.

FIG. 4 is a flow diagram that depicts a method 400 for determining a deployment plan for a cloud-based application, according to one or more embodiments. Method 400 is typically executed by software modules executing within application management server 110.

Method 400 begins at step 405, where application management server 110 receives a request to deploy a cloud-based application. Such a request is typically generated and transmitted from an application designer that accesses a host-based user interface, such as user interface 105 of management host 100.

After receiving the deployment request, method 400 proceeds to step 410. At step 410, application management server 110 reads a deployment plan for the application that is requested for deployment. According to one or more embodiments, the application deployment plan is read from an application deployment plan repository, such as the repository depicted in FIG. 1.

After reading the application deployment plan at step 410, method 400 proceeds to step 415. At step 415, application management server 110 determines the target cloud infrastructure for the deployment request. In embodiments, an application designer may request deployment of an application using a user interface such as user interface 200 depicted in FIGS. 2A and 2B. As shown in the FIGS. 2A and 213B, user interface 200 includes pulldown menu 220, which enables an application designer to select from a list of target infrastructures. In some embodiments, application management server 110 may automatically select an appropriate target cloud infrastructure by matching the requirements of the deployment plan to the capabilities of available cloud infrastructures. Further, user interface 200 provides a button 230 to instruct application management server 110 to transmit a deployment request to a cloud management server. When button 230 is selected, embodiments of application management server 110 determine which of the cloud infrastructures is selected.

After determining the target infrastructure at step 415, method 400 then proceeds to step 420. At step 420, application management server 110 determines whether the selected target infrastructure requires the execution of any infrastructure-specific (i.e., customized) tasks prior to deployment of an application to that infrastructure. For example, application management server 110 may determine that certain infrastructures that assign IP addresses in a dynamic fashion (according to, for instance, a DHCP protocol) to newly instantiated virtual machines do not publish those addresses for use by software configuration programs. Thus, for such infrastructures, application management server 110 determines that one or more tasks need to be included in the deployment plan for the requested application.

It should be noted that other infrastructure-specific tasks (aside from tasks related to the discovery of dynamically assigned IP addresses of virtual machines) may be determined as required to be executed on the target infrastructure prior to an application deployment thereto. For example, the process of configuring a deployed application may require information regarding the mount points of certain data storage devices in a Network File System (NFS)-based storage network. In another example, an application may require to be configured with the address of a firewall or proxy server that is unknown to an application designer prior to deployment. In still another example, deployed virtual machines, during execution, may perform clock synchronization between their respective system clocks. In such a case, the virtual machines would typically use the Network Time Protocol (NTP) in order to access certain accurate NTP time servers whose addresses would need to be included in the deployed virtual machines' configurations.

If, at step 420, application management server 110 determines that the target infrastructure does not require the execution of any custom tasks, then method 400 proceeds directly to step 435, where application management server 110 commences transmitting deployment requests based on the deployment plan for the requested application to cloud management server 155. However, if, at step 420, application management server 110 determines that the target cloud infrastructure does require the execution of infrastructure-specific tasks, then method 400 proceeds to step 425.

At step 425, application management server 110 reads infrastructure-specific tasks that are required to be carried out. In one or more embodiments, the infrastructure-specific tasks are stored in a repository that is accessible to application management server. In such a repository, each of the tasks is associated with a particular infrastructure and a particular phase that precedes it (e.g., the "bootstrap" phase). For example, referring to FIG. 2B, the tasks in task lists 210 that are included in the pre-exec phase are stored in the aforementioned repository associated with Infrastructure 2 (the selected target infrastructure in FIG. 2B) and with the bootstrap phase (which is the preceding phase).

Next, method 400 proceeds to step 430. At step 430, application management server 110 inserts the infrastructure-specific tasks read at step 425 into the overall application deployment plan as a new phase of the deployment. For example, the application management server 110 inserts the tasks in task lists 210 into a new pre-exec phase, as shown in FIG. 2B.

Method 400 then proceeds to step 435, where application management server 110 commences transmitting deployment requests based on the deployment plan for the requested application to cloud management server 155. After step 435, method 400 terminates.

Figure 5:
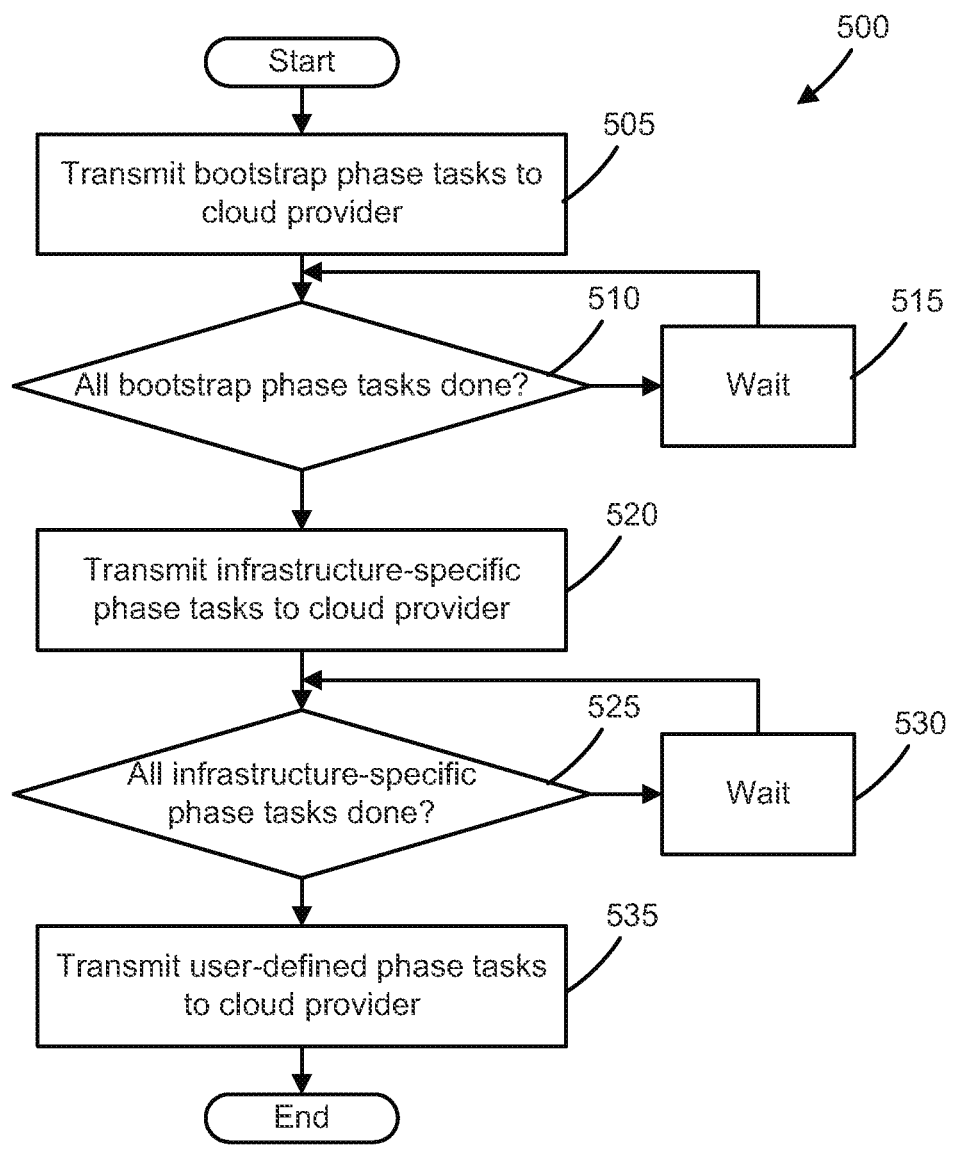
FIG. 5 is a flow diagram that depicts a method of transmitting deployment requests in phases to a cloud management server, according to one or more embodiments.

FIG. 5 is a flow diagram that depicts a method 500 of transmitting deployment requests in phases to a cloud management server, according to one or more embodiments. Method 500 is typically executed by one or more software modules executing within application management server 110 (such as, for example, application deployment requestor 140).

Method 500 begins at step 505, where application management server 110 transmits bootstrap phase tasks to a cloud provider (e.g., cloud management server 155 in FIG. 1). As previously mentioned, in certain embodiments, tasks executed in the bootstrap phase include the instantiation of virtual machines in the cloud infrastructure, as well as distributing deployment agent platforms to the instantiated virtual machines. Deployment agents are configured to execute within the instantiated virtual machines and are configured to communicate with cloud management servers, download software packages, and initiate the installation of those packages.

Next, at step 510, application management server 110 monitors the deployment and determines whether all bootstrap phase tasks that were transmitted at step 505 have completed. If application management server 110 determines that all bootstrap phase tasks have not completed, then method 500 proceeds to step 515, where application management server 110 waits a predetermined amount of time. After waiting the predetermined amount of time, method 500 proceeds back to step 510, where application management server 110 again determines whether all bootstrap phase tasks have completed.

When application management server 110 determines that all bootstrap phase tasks have indeed completed, then method 500 proceeds to step 520. At step 520, application management server 110 transmits infrastructure-specific tasks (i.e., "custom" tasks) to the cloud provider. As previously mentioned, examples of infrastructure-specific tasks include network setup tasks that were described in connection with FIG. 2B. After transmitting the infrastructure-specific tasks, application management server 110 monitors the deployment and determines whether all infrastructure-specific tasks transmitted at step 520 have completed. If application management server 110 determines that all infrastructure-specific tasks have not completed, then method 500 proceeds to step 530, where application management server 110 waits a predetermined amount of time. After waiting the predetermined amount of time, method 500 proceeds back to step 525, where application management server 110 again determines whether all infrastructure-specific tasks have completed. Due to the combination of steps 520, 525, and 530, the infrastructure-specific tasks comprise a distinct deployment phase (e.g., a pre-exec phase).

When application management server 110 determines that all infrastructure-specific tasks have indeed completed, then method 500 proceeds to step 535. At step 535, application management server 110 transmits so called "user-defined" (i.e., exec phase) tasks to the cloud provider. Typically, user-defined tasks comprise instructions for the virtual machines to download software packages and initiated installation of the software packages therein. As previously mentioned, this is typically accomplished by transmitting a request to cloud management server 155, which, in turn, invokes the individual deployment agents of the virtual machines instantiated in the cloud. The deployment agents then download and install the appropriate software modules in accordance with the overall deployment plan for the application.

After step 535, method 500 terminates. However, it should be noted that, in other embodiments, additional task phases (i.e., "post-exec" phases) may be transmitted to and executed in the cloud platform after the user-defined tasks have completed. Such additional phases include, for example, deleting temporary files and unmounting any temporarily mounted disks required for installation and configuration of application components during previous phases.

Figure 6:
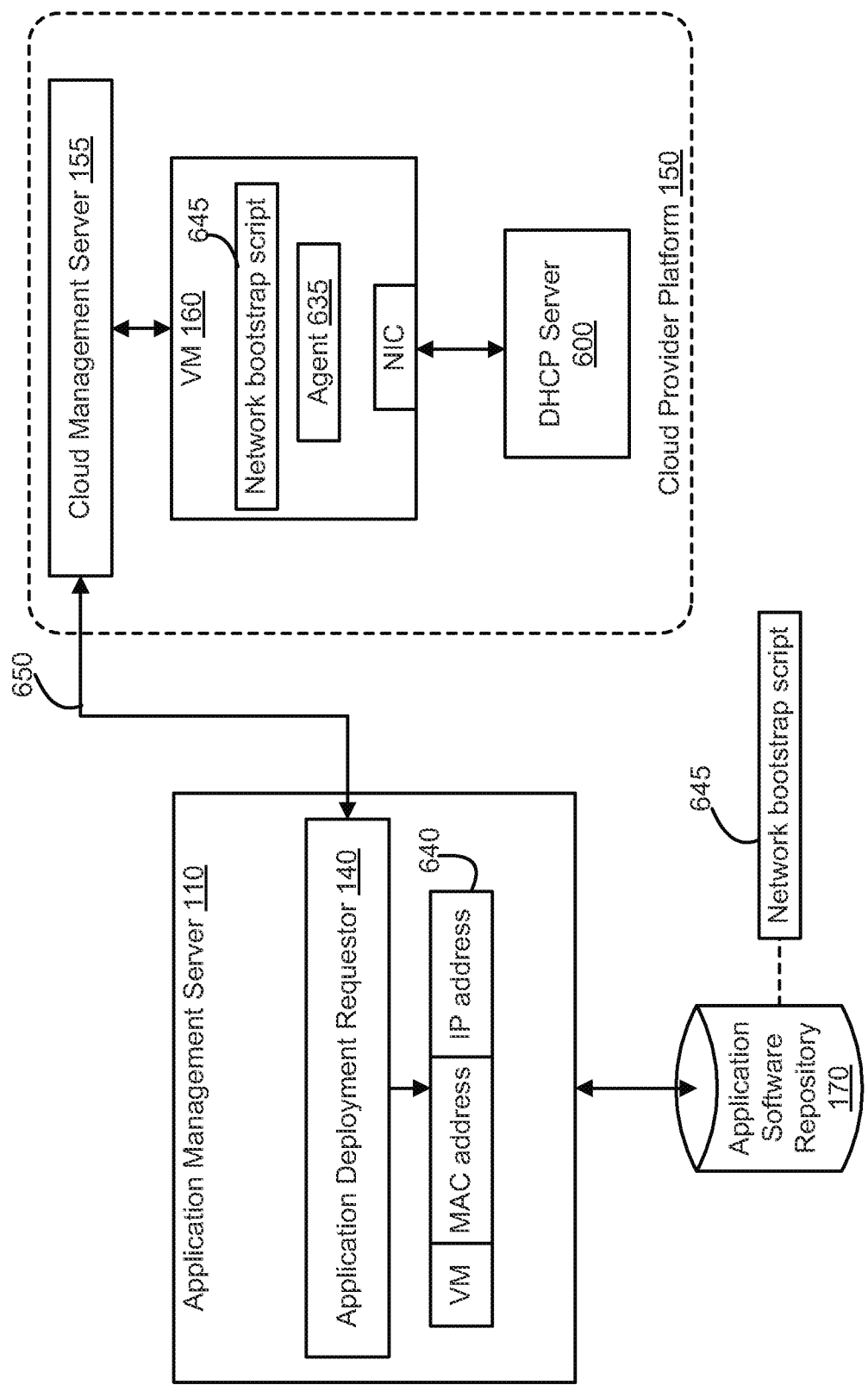
FIG. 6 is a conceptual diagram that illustrates, according to one or more embodiments, a process for discovering a dynamically allocated IP address for a virtual machine instantiated in a cloud infrastructure.

As was previously mentioned, one example of a "pre-exec" phase task is discovering dynamically assigned IP addresses of virtual machines that are instantiated in a cloud infrastructure. Further, after discovering those IP addresses, such a pre-exec task performs updates to installation scripts or installation configuration files based on the discovered addresses. FIG. 6 is a conceptual diagram that illustrates, according to one or more embodiments, a process for discovering a dynamically allocated IP address for a virtual machine instantiated in a cloud infrastructure and updating software installation files based on the discovered addresses.

As shown in FIG. 6, VM 160 is a virtual machine instantiated by cloud management server 155 in cloud provider platform 150. Cloud management server 155 instantiates VM 160 in response to a request (i.e., a "bootstrap" phase request) transmitted by application deployment requestor 140. At the time VM 160 is instantiated, VM 160 includes, among other things, a virtual network interface card (or NIC). The virtual NIC emulates a physical network adapter for the virtual machine and enables the virtual machine to communicate over virtual communication channels with other cloud virtual machines, as well as with physical networks that are external to the cloud platform. When VM 160 is instantiated, the virtual NIC is assigned a MAC address. According to embodiments, the MAC address is included with the request transmitted by application deployment requestor 140. An application designer configures MAC addresses for virtual NICs when generating an application blueprint using application modeling module 115. Thus, at the time an application blueprint is generated, application management server 110 associates a modeled virtual machine with one or more MAC addresses, which correspond to the virtual NICs configured therein. As previously mentioned, when VM 160 is instantiated, VM 160 is also supplied with a deployment agent 635. Deployment agent 635, according to one or more embodiments, enables VM 160 to communicate with application management server 110 (via cloud management server 155) in order to, for example, access and install software packages during an application deployment.

Further, in cloud environments that assign IP addresses dynamically (e.g., according to the DHCP protocol), VM 160 (or, alternatively, cloud management server 155) transmits one or more requests to a DHCP server 600 to generate an IP address for each virtual NIC configured therein. In response, DHCP server 600 generates one or more IP addresses, which are assigned to each virtual NIC of VM 160. That is, once the IP addresses are assigned, VM 160 may be addressed over a TCP/IP-based network using the assigned addresses. However, when the IP addresses are assigned to the virtual NICs of VM 160, these addresses are not known to application management server 110, nor are they present in any installation scripts or configuration files for any of the software packages to be installed on virtual machines instantiated in cloud provider platform 150. This presents a problem for certain applications (such as database clients and load balancers) that need to connect to other virtual machines during installation. For example, if a database client application is installed on a virtual machine, it is often the case that the client application installation process needs to connect to a database that is running on a different virtual machine in order to ensure that the application is operating properly. Without knowing the IP address of the database server virtual machine, the installation of the database client application fails.

Therefore, as shown in FIG. 6, application deployment requestor 140 transmits to cloud management server 155, during a "pre-exe" deployment phase, a network bootstrap script 645. According to embodiments of the present invention, network bootstrap script 645 is received by cloud management server 155 and deployed to VM 160. VM 160 then executes network bootstrap script 645 in order to determine the IP address of each virtual NIC configured therein. In one or more embodiment, network bootstrap script 645 reads configuration properties corresponding to the virtual NICs in order to determine the IP addresses thereof. In addition, network bootstrap script 645 associates each IP address with the MAC address of the corresponding virtual NIC. Network bootstrap script 645 then transmits the MAC addresses and IP addresses back to application management server 110 (via cloud management server 155), as shown by the arrow denoted as 650 in FIG. 6. Application management server 110 then receives the MAC and IP addresses. At that time, application management server 110 associates the received MAC and IP addresses with the corresponding virtual machine that is a component of the current deployment. It should be noted that application management server 110 is able to perform the association because, as mentioned earlier, application management server 110 associates each virtual machine configured in an application blueprint with a MAC address for each virtual NIC configured for the corresponding virtual machine. The association of a virtual machine with MAC and IP addresses is depicted in FIG. 6 by table 640.

In addition, application management server 110 updates installation packages, such as web archive (WAR) files, enterprise archive (EAR) files, and application installation configuration files based on the received IP addresses. For example, if a database client application is to be deployed to several virtual machines in the cloud infrastructure, each of which must connect to a database server during installation of the database client application, then application management server 110 updates, for example, a WAR file for the database client application (which resides, typically, in application software repository 170). According to embodiments, the update consists of inserting the IP address of the database server at an appropriate point in the target WAR file. Therefore, when the WAR file is downloaded and installed at a later point in the deployment by client virtual machines instantiated in the cloud infrastructure, each of the client virtual machines that install the database client application are able to connect to the database server virtual machine using the inserted IP address.

Figure 7:
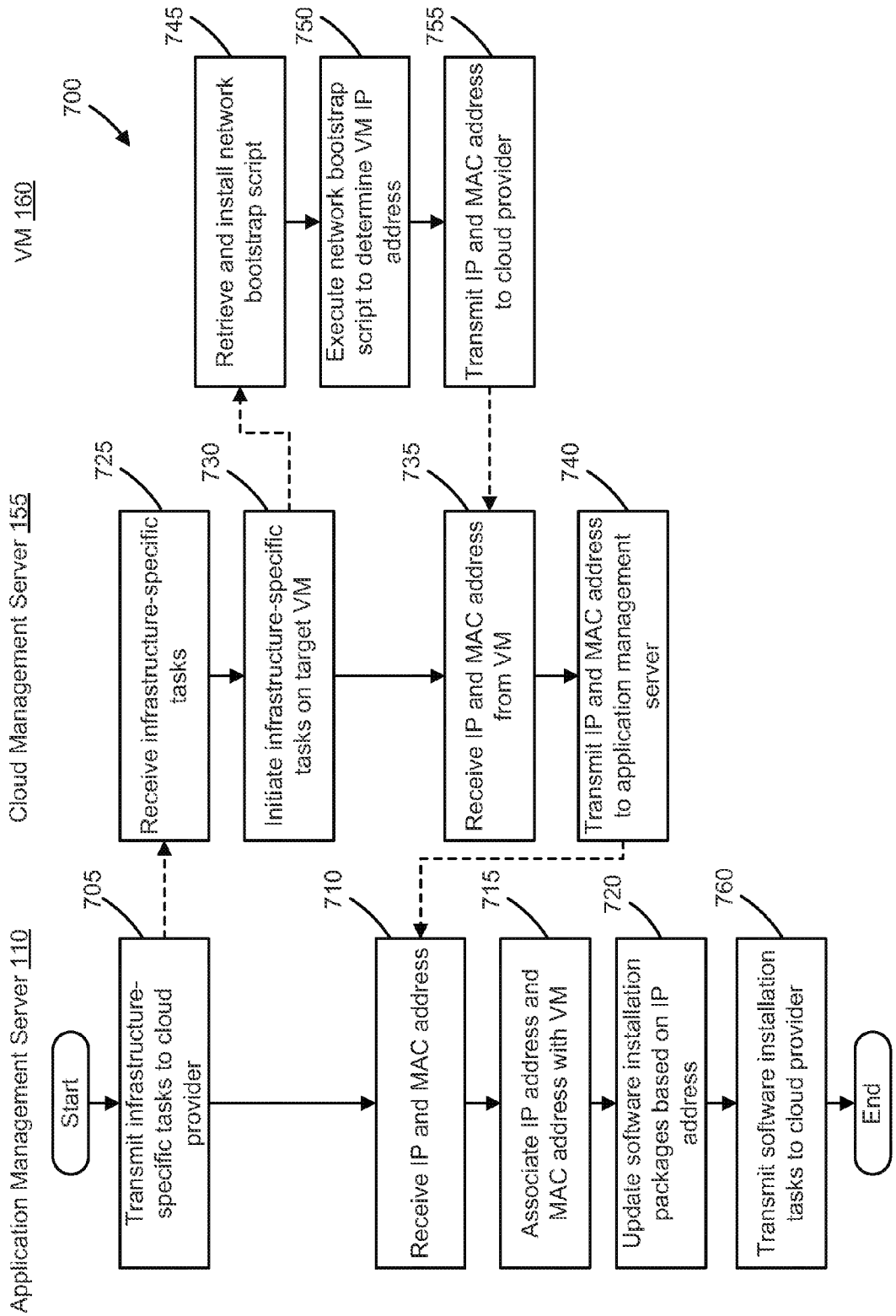
FIG. 7 is a flow diagram that illustrates a method for discovering and communicating to a deployment platform IP addresses of virtual machines provisioned in a cloud-based infrastructure, according to embodiments.

FIG. 7 is a flow diagram that illustrates a method 700 for discovering IP addresses of virtual machines provisioned in a cloud-based infrastructure, according to embodiments. The steps of method 700 are typically performed by application management server 110, cloud management server 155, and VM 160. Method 700 begins at step 705, where application management server 110 transmits one or more infrastructure-specific tasks to a cloud management server. As previously mentioned, infrastructure-specific tasks are typically performed in a "pre-exec" phase of an application deployment. In the embodiment illustrated in FIG. 7, the infrastructure-specific tasks include instructions for a virtual machine to retrieve and execute a "network bootstrap" script that discovers and transmits IP addresses for virtual NICs configured for the virtual machine.

At step 725, cloud management server 155 receives the infrastructure-specific tasks from application management server 110. Next, at step 730, cloud management server 155 initiates the infrastructure-specific tasks on one or more virtual machines instantiated in the cloud infrastructure. In embodiments, cloud management server 155 instructs one or more virtual machines to retrieve the aforementioned network bootstrap script from a data storage device accessible to each cloud-based virtual machine. In response, at step 745, a VM 160, having been instructed as above, retrieves and installs the network bootstrap script. At step 750, VM 160 then executes the network bootstrap script in order to determine the IP addresses associated with one or more virtual NICs of the virtual machine. After determining the IP addresses, VM 160 transmits the IP address for each NIC, as well as the MAC address for each NIC. Each transmitted address pair forms an association between a MAC address and an IP address. The address pairs are transmitted back to cloud management server 155.

At step 735, cloud management server 155 receives the transmitted IP and MAC addresses from VM 160. At step 740, cloud management server transmits the received IP and MAC addresses back to application management server 110.

Application management server 110, at step 710, receives the IP and MAC addresses from cloud management server 155. Next, at step 715, application management server 110 associates the receive IP and MAC addresses with a corresponding virtual machine that is a component of the application currently under deployment. After performing the association, application management server 110 then updates software packages that are to be deployed to virtual machines in the cloud infrastructure, based on the received IP addresses. In one example, mentioned earlier, application management server updates the WAR file for a database client application by inserting the IP address of a database server. In still another example, application management server 110 updates a properties file included in an installation package for a load balancing server. The properties file is updated with the IP addresses of each virtual machine that the load balancer connects to during execution.

Finally, at step 760, application management server transmits one or more software installation tasks to cloud management server 155. According to this embodiment, the software installation tasks transmitted at step 760 are "exec" phase tasks. Once the tasks are received by cloud management server 155, cloud management server 155 instructs one or more VMs 160 (via corresponding deployment agents) to download and install the software packages that application management server 110 updated in step 720.

Although one or more embodiments have been described herein in some detail for clarity of understanding, it should be recognized that certain changes and modifications may be made without departing from the spirit of the disclosure. The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, yielding, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD) (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. In a cloud computing environment comprising a cloud deployment platform with an application management server executing thereon, and a cloud management server configured to manage a plurality of virtual machines deployed in a cloud infrastructure, a method of deploying a cloud based application, the method comprising:
   reading a deployment plan for the cloud based application, the deployment plan comprising one or more deployment phases and a first plurality of tasks, independent of the cloud infrastructure, divided among the one or more phases to be executed in the cloud infrastructure;
   determining that one or more custom tasks are required to be executed in the cloud infrastructure;
   inserting a new deployment phase into the deployment plan, the new deployment phase comprising the one or more custom tasks; and
   transmitting the one or more custom tasks and the first plurality of tasks to the cloud management server for execution in the cloud infrastructure.

2. The method of claim 1, further comprising:
   determining that the cloud infrastructure corresponds to a first cloud provider.

3. The method of claim 2, wherein the tasks of a first deployment phase are transmitted to the cloud management server before the tasks of a second deployment phase.

4. The method of claim 1, wherein the tasks of the new deployment phase comprise one or more tasks that, when executed in the cloud infrastructure, cause one or more network addresses to be transmitted by the cloud management server to the application management server.

5. The method of claim 4, further comprising:
   receiving, by the application management server, the one or more network addresses from the cloud management server; and
   updating, by the application management server, one or more software installation packages based on the received network addresses.

6. The method of claim 5, wherein the one or more network addresses are internet protocol (IP) addresses.

7. The method of claim 1, wherein transmitting the second plurality of tasks to the cloud management server comprises:
   transmitting the tasks of a first deployment phase to the cloud management server;
   after said transmitting of the tasks of the first deployment phase, transmitting the tasks of the new deployment phase to the cloud management server; and
   after said transmitting of the tasks of the new deployment phase, transmitting the tasks of a second deployment phase to the cloud management server.

8. The method of claim 7, further comprising:
   before transmitting the tasks of the new deployment phase, to the cloud management server:
   monitoring the tasks of the first deployment phase; and
   determining that each of the tasks of the first deployment phase has completed executing in the cloud infrastructure.

9. The method of claim 3, wherein the tasks of the first deployment phase comprise one or more tasks that, when executed in the cloud infrastructure, instantiate one or more virtual machines in the cloud infrastructure.

10. The method of claim 3, wherein the tasks of the second deployment phase comprise one or more tasks that, when executed in the cloud infrastructure, cause software to be installed on one or more of the virtual machines instantiated in the cloud infrastructure.

11. A non-transitory computer-readable medium comprising instructions executable by one or more hosts in a cloud computing environment, the cloud computing environment comprising a cloud deployment platform with an application management server executing thereon, and a cloud management server configured to manage a plurality of virtual machines deployed in a cloud infrastructure, where the instructions, when executed, cause the one or more hosts to perform a method of deploying a cloud based application, the method comprising:

reading a deployment plan for the cloud based application, the deployment plan comprising one or more deployment phases and a first plurality of tasks, independent of the cloud infrastructure, divided among the one or more deployment phases to be executed in the cloud infrastructure;

determining that one or more custom tasks are required to be executed in the cloud infrastructure;

inserting a new deployment phase into the deployment plan, the new deployment phase comprising the one or more custom tasks; and transmitting the one or more custom tasks and the first plurality of tasks to the cloud management server for execution in the cloud infrastructure.

12. The computer-readable medium of claim 11, wherein the method further comprises:

determining that the cloud infrastructure corresponds to a first cloud provider.

13. The computer-readable medium of claim 12, wherein the tasks of a first deployment phase are transmitted to the cloud management server before the tasks of a second deployment phase.

14. The computer-readable medium of claim 13, wherein the tasks of the new deployment phase comprise one or more tasks that, when executed in the cloud infrastructure, cause one or more network addresses to be transmitted by the cloud management server to the application management server, and the method further comprises:

receiving, by the application management server, the one or more network addresses from the cloud management server; and updating, by the application management server, one or more software installation packages based on the received network addresses.

15. The computer-readable medium of claim 13, wherein transmitting the second plurality of tasks to the cloud management server comprises:

transmitting the tasks of the first deployment phase to the cloud management server;

after said transmitting of the tasks of the first deployment phase, transmitting the tasks of the new deployment phase to the cloud management server; and after said transmitting of the tasks of the new deployment phase, transmitting the tasks of the second deployment phase to the cloud management server.

16. The computer-readable medium of claim 15, the method further comprising:

before transmitting the tasks of the new deployment phase, to the cloud management server:

monitoring the tasks of the first deployment phase; and determining that each of the tasks of the first deployment phase has completed executing in the cloud infrastructure.

17. A virtualized cloud computing system, comprising:

one or more host computers that implement a cloud deployment platform with first and second modules executing thereon;

a plurality of host computers executing in a cloud infrastructure, each configured to execute one or more virtual machines therein; and a cloud management server configured to manage the virtual machines in the cloud infrastructure; and a management host configured with a user interface, wherein the system is configured to perform a method of deploying a cloud based application, the method comprising:

reading a deployment plan for the cloud based application, the deployment plan comprising one or more deployment phases and a first plurality of tasks, independent of the cloud infrastructure, divided among the one or more phases to be executed in the cloud infrastructure;

determining that one or more custom tasks are required to be executed in the cloud infrastructure;

inserting a new deployment phase into the deployment plan, the new deployment phase comprising the one or more custom tasks into the first plurality of tasks to generate a second plurality of tasks; and transmitting one or more custom tasks and the first plurality of tasks to the cloud management server for execution in the cloud infrastructure.

18. The system of claim 17, the method further comprising:

determining that the cloud infrastructure corresponds to a first cloud provider.

19. The system of claim 18, wherein the tasks of a first deployment phase are transmitted to the cloud management server before the tasks of a second deployment phase.

* * * * *